United States Patent
Yoshioka et al.

(10) Patent No.: US 6,656,531 B2
(45) Date of Patent: Dec. 2, 2003

(54) CLEAR COATING WITH COMPOSITION OF ACRYLIC AND POLYESTER POLYCARBOXYLIC ACIDS, POLYEPOXIDE AND CROSSLINKED RESIN PARTICLES

(75) Inventors: Manabu Yoshioka, Shijonawate (JP); Akira Fushimi, Ikoma (JP); Seigo Miyazoe, Ibaraki (JP); Masanobu Inoue, Nishinomiya (JP); Yoshio Eguchi, Ikeda (JP)

(73) Assignee: Nippon Paint Co., Ltd., Osaka (JP)

(*) Notice: Subject to any disclaimer, the term of this patent is extended or adjusted under 35 U.S.C. 154(b) by 0 days.

(21) Appl. No.: 10/134,514

(22) Filed: Apr. 30, 2002

(65) Prior Publication Data

US 2002/0161121 A1 Oct. 31, 2002

Related U.S. Application Data

(62) Division of application No. 09/450,719, filed on Nov. 30, 1999, now Pat. No. 6,410,647, which is a division of application No. 08/875,175, filed as application No. PCT/JP96/00079 on Jan. 19, 1996, now abandoned.

(30) Foreign Application Priority Data

Jan. 24, 1995 (JP) ............................................. 1995-9100

(51) Int. Cl.[7] .............................. B05D 1/36; B05D 3/02; C08L 33/02; C08L 63/00; C08L 67/00
(52) U.S. Cl. .................... 427/386; 427/407.2; 427/408; 427/410; 525/111; 525/166; 525/172
(58) Field of Search ................................. 525/111, 166, 525/172; 427/386, 407.2, 408, 410

(56) References Cited

U.S. PATENT DOCUMENTS

| | | | |
|---|---|---|---|
| 4,086,293 A | 4/1978 | Smith et al. | 525/411 |
| 4,368,287 A | 1/1983 | Ishikura et al. | 524/413 |
| 4,499,239 A | 2/1985 | Murakami et al. | 525/111 |
| 4,728,543 A | 3/1988 | Kurauchi et al. | 427/407.1 |
| 4,777,199 A | 10/1988 | Ishii et al. | 524/556 |
| 4,822,831 A | 4/1989 | Kuwajima et al. | 524/504 |
| 4,871,806 A | 10/1989 | Shalati et al. | 525/111 |
| 4,937,173 A | 6/1990 | Kanda et al. | 524/457 |
| 4,988,767 A | 1/1991 | Pettit, Jr. | 525/111 |
| 5,102,925 A | 4/1992 | Suzuki et al. | 523/502 |
| 5,374,682 A | 12/1994 | Gouda et al. | 525/186 |
| 5,439,988 A | 8/1995 | Moens et al. | 525/437 |
| 5,536,785 A | 7/1996 | Foukes et al. | 525/111 |
| 5,686,531 A | 11/1997 | Engelke et al. | 525/111 |

FOREIGN PATENT DOCUMENTS

| | | |
|---|---|---|
| EP | 503865 | 9/1992 |
| EP | 0581517 | 2/1994 |
| EP | 0588560 | 3/1994 |
| JP | 56-47457 | 4/1981 |
| JP | 57-205458 | 12/1982 |
| JP | 59-30817 | 2/1984 |
| WO | 95/28452 | 10/1995 |

*Primary Examiner*—Robert E. Sellers, II
(74) *Attorney, Agent, or Firm*—Wenderoth, Lind & Ponack, L.L.P.

(57) ABSTRACT

A method for forming a coated film comprises
(1) applying a water or solvent based coating composition on an undercoated or intercoated substrate to form a base coating,
(2) applying a clear coating composition thereon to form a clear coating without curing the base coating, and
(3) heating and curing both the base coating and clear coating, wherein the clear coating composition comprises as a binder
  (a) from 10–70% by weight of an acrylic polycarboxylic acid having on average 2 or more carboxyl groups per molecule obtained by copolymerizing an acid anhydride group-containing ethylenically unsaturated monomer with an ethylenically unsaturated monomer having no acid anhydride group, then reacting the resulting copolymer with a monoalcohol;
  (b) from 5–70% by weight of a polyester polycarboxylic acid having an acid value of from 50–350 mg KOH/g (solid) obtained by reacting a polyester polyol having 3 or more hydroxyl groups with an acid anhydride group-containing compound;
  (c) from 10–80% by weight of a polyepoxide with both an epoxy group and a hydroxyl group; and
  (d) crosslinked resin particles prepared in the presence of an amphoteric ionic group-containing polyester.

9 Claims, No Drawings

CLEAR COATING WITH COMPOSITION OF ACRYLIC AND POLYESTER POLYCARBOXYLIC ACIDS, POLYEPOXIDE AND CROSSLINKED RESIN PARTICLES

This application is a divisional application of Ser. No. 09/450,719 filed Nov. 30, 1999, U.S. Pat. No. 6,410,647, which is a divisional application of Ser. No. 08/875,175 filed Jul. 18, 1997, now abandoned, which is a 371 application of International Application No. PCT/JP96/00079 filed Jan. 19, 1996.

FIELD OF THE INVENTION

The present invention relates to a curable resin composition which is suitable for an automotive top coating composition and a coil coating composition.

BACKGROUND OF THE INVENTION

A top coating composition for an automobile generally comprises, as a binder component, a combination of a hydroxyl group-containing polymer and a melamine resin curing agent. However, a coated film obtained by using a melamine resin as a curing agent generally has poor acid resistance. Accordingly, such a coated film is liable to be damaged by an acid rain which has recently become a serious problem, and an appearance of the coated film is deteriorated.

The poor acid resistance which is provided by using a melamine resin is believed to originate from a triazine nucleus in the melamine resin. Accordingly, a drawback of poor acid resistance occurs, so far as a melamine resin is used as a curing agent.

In Japanese Laid-Open Patent Publication Nos. 2-45577 and 3-287650, there is suggested a novel coating composition without using a melamine resin. The coating composition comprises an acid group and an epoxy group therein, and the acid group and the epoxy group reacts to form a crosslinking point of an ester bond, and therefore, acid resistance of the resulting coated film is excellent.

The coating composition, however, has high functional group content and high viscosity. Therefore, a large amount of solvent must be used for controlling viscosity, and it is difficult to prepare a high-solid type coating composition.

On the other hand, in order to reduce the harmful influence on the environment, a high-solid coating composition which volatilizes a small amount of solvent into air has recently been required.

In Japanese Laid-Open Patent Publication No. 6-166741, there is disclosed a high-solid coating composition using a silicone polymer. In this reference, a hydroxyl group functional silicone polymer is reacted with an acid anhydride group-containing compound in order to impart acid functionality, and incorporated into the coating composition. Accordingly, an amount of functional group of the composition can not be increased, Tg of the resulting resin becomes low, and therefore, Tg of the resulting coated film can not be increased.

In Japanese Laid-Open Patent Publication No. 6-41575, there is disclosed a high-solid coating composition comprising a polyepoxide (a) and a polyester polycarboxylic acid (b). However, solid content of the coating composition is not sufficiently high in order to prevent the harmful influence on the environment, and the coated film formed has poor acid resistance.

OBJECTS OF THE INVENTION

An object of the present invention is to solve the above conventional problem, and provide a high-solid curable resin composition which forms a coated film having excellent acid rain resistance, mar resistance and appearance, as well as a high-solid coating composition and a method for forming a coated film using the same.

SUMMARY OF THE INVENTION

That is, the present invention provides a high-solid curable resin composition, comprising:

(a) 10 to 70% by weight of an acrylic polycarboxylic acid having 2 or more carboxyl groups per molecule on an average, an acid value of 5 to 300 mg KOH/g (solid) and a number-average molecular weight of 500 to 8000;

(b) 5 to 70% by weight of a polyester polycarboxylic acid having an acid value of 50 to 350 mg KOH/g (solid), a number-average molecular weight of 400 to 3500 and a ratio of weight-average molecular weight to number-average molecular weight of 1.8 or less, which is obtained by reacting a polyester polyol having 3 or more hydroxyl groups with an acid anhydride group-containing compound; and (c) 10 to 80% by weight of a polyepoxide having an epoxy equivalent of 50 to 700 and a number-average molecular weight of 200 to 10000; provided that the amounts of the components (a) to (c) are based on the weight of the total solid contained in the curable resin composition.

DETAILED DESCRIPTION OF THE INVENTION

An acrylic polycarboxylic acid (a) to be used in the present invention has 2 or more carboxyl groups per molecule on an average, an acid value of 5 to 300 mg KOH/g, preferably 25 to 250 mg KOH/g, more preferably 50 to 200 mg KOH/g, and a number average-molecular weight of 500 to 8000, preferably 800 to 6000, more preferably 1500 to 4000.

The acrylic polycarboxylic acid is obtained by copolymerizing 5 to 80% by weight of a carboxyl group-containing ethylenically unsaturated monomer with 20 to 95% by weight of an ethylenically unsaturated monomer having no carboxyl group according to a method known to the art. For example, the copolymerization can be carried out at a polymerization temperature of 80 to 200° C. for a polymerization time of 3 to 10 hours under normal or applied pressure, using an azo or peroxide initiator as a radical polymerization initiator in an amount of 0.5 to 20 parts by weight, based on 100 parts by weight of the total ethylenically unsaturated monomers. Conventional polymerization controlling agents such as a chain transfer agent, a color protection agent and the like may be added during the polymerization.

Examples of the carboxyl group-containing ethylenically unsaturated monomer include acrylic acid, methacrylic acid, itaconic acid, maleic acid, an adduct of these with ε-caprolactone (e.g. "Allonix M-5300", manufactured by Toa Gosei Kagaku Co., Ltd., etc.), an adduct of an ethylenically unsaturated monomer having a hydroxyl group represented by the formula (I) with an acid anhydride group-containing compound, and an adduct of an acid anhydride group-containing ethylenically unsaturated monomer with a monoalcohol. The ethylenically unsaturated monomer having a carboxyl group can be used alone or in combination thereof.

The acid anhydride group-containing compound is half-esterified by a hydroxyl group to provide a carboxy functional group in an ambient reaction condition such as room temperature to 150° C. under normal pressure. It is preferred to use an acid anhydride group-containing compound having 4 to 12 carbon atoms, particularly 8 to 10 carbon atoms, which has a (unsaturated or saturated) cyclic group. Such a component may improve compatibility of the resulting resin.

Examples of the preferred acid anhydride group-containing compound include phthalic anhydride, tetrahydrophthalic anhydride, hexahydrophthalic anhydride, 4-methyl hexahydrophthalic anhydride, trimellitic anhydride, succinic anhydride, etc.

Examples of the acid anhydride group-containing ethylenically unsaturated monomer to be used herein include itaconic anhydride, maleic anhydride, citraconic anhydride, etc.

Examples of the monoalcohol to be used herein include methanol, ethanol, n-propanol, i-propanol, n-butanol, i-butanol, t-butanol, n-hexyl alcohol, lauryl alcohol, methyl cellosolve, ethyl cellosolve, methoxypropanol, ethoxypropanol, furfuryl alcohol, dimethylamino ethanol, diethylamino ethanol, acetol, allyl alcohol, propargyl alcohol, etc.

Examples of the ethylenically unsaturated monomer having no carboxyl group include styrene, α-methylstyrene, p-t-butylstyrene, (meth)acrylate (e.g. methyl(meth)acrylate, ethyl(meth)acrylate, propyl(meth)acrylate, n-, i- and t-butyl (meth)acrylate, 2-ethylhexyl(meth)acrylate, lauryl(meth) acrylate, cyclohexyl(meth)acrylate, isobornyl(meth) acrylate), etc.), VeoVa-9 and VeoVa-10 manufactured by Shell Co., etc. When styrene or a styrene derivative is used as the ethylenically unsaturated monomer having no carboxyl group, it is preferred to use it in an amount of 5 to 40% by weight.

A preferred acrylic polycarboxylic acid (a) of the curable resin composition of the present invention, has a carboxyl group and a carboxylate group, which bond to adjacent carbon atoms each other, because acid resistance of the resulting coated film is improved. The acrylic polycarboxylic acid (a) having a carboxyl group and a carboxylate group is obtained, for example, by reacting an acrylic polyacid anhydride (a)(i) with a monoalcohol (a)(ii).

The acrylic polyacid anhydride (a)(i) is obtained by copolymerizing 15 to 40% by weight, preferably 15 to 35% by weight of an acid anhydride group-containing ethylenically unsaturated monomer (a)(i)(1) with 60 to 85% by weight, preferably 65 to 85% by weight of an ethylenically unsaturated monomer having no acid anhydride group (a) (i)(2). When an amount of the acid anhydride group-containing ethylenically unsaturated monomer (a)(i)(1) is smaller than 15% by weight, curability becomes poor. On the other hand, when the amount exceeds 40% by weight, the resulting coated film becomes too brittle, which results in poor weather resistance. Examples of the acid anhydride group-containing ethylenically unsaturated monomer (a)(i) (1) include those which have already been described.

The ethylenically unsaturated monomer having no acid anhydride group (a)(i)(2) is not specifically limited unless it exerts a harmful influence on an acid anhydride group. Preferred are those having 3 to 15 carbon atoms, particularly 3 to 12 carbon atoms, which has one ethylenically unsaturated bond.

A mixture of 2 or more ethylenically unsaturated monomers also may be used as the ethylenically unsaturated monomer having no acid anhydride group (a)(i)(2), because it is effective to improve compatibility between resins. Specific examples of the monomer (a)(i)(2) include those described above as the ethylenically unsaturated monomer having no carboxyl group.

A monomer having a carboxyl group, such as acrylic acid, methacrylic acid, itaconic acid, maleic acid, etc. can also be used as the ethylenically unsaturated monomer having no acid anhydride group (a)(i)(2). Particularly preferred is a long-chain carboxylic acid monomer having a spacer moiety of about 5 to 20 carbon atoms between an ethylenically unsaturated group and a carboxyl group. Specific examples thereof include an adduct of the monomer having a carboxyl group with ε-caprolactone (e.g. Allonix M-5300). The long-chain carboxylic acid monomer may improve mar resistance of the coated film.

For example, a carboxyl group-containing ethylenically unsaturated monomer obtained by subjecting a hydroxyl group-containing ethylenically unsaturated monomer and an acid anhydride group-containing compound to the half esterification reaction in an amount that a molar ratio of a hydroxyl group to an acid anhydride group becomes 1/0.5 to 1/1.0, preferably 1/0.8 to 1/1.0, can be used as the ethylenically unsaturated monomer having no acid anhydride group (a)(i)(2). When the molar ratio is more than 1/0.5, viscosity of the polymer becomes high, which results in poor workability. On the other hand, when the molar ratio is less than 1/1.0, the excessive acid anhydride group-containing compound remains in the resulting coated film, which results in poor water resistance.

The hydroxyl group-containing ethylenically unsaturated monomer to be used herein preferably has 5 to 23 carbon atoms, more preferably 5 to 13 carbon atoms. When a carbon chain of the monomer is too short, flexibility around a crosslinking point becomes poor, and the resulting coated film becomes too hard. On the other hand, when the carbon chain is too long, a molecular weight between crosslinking points becomes too large. Generally, the hydroxyl group-containing ethylenically unsaturated monomer has a structure represented by the formula:

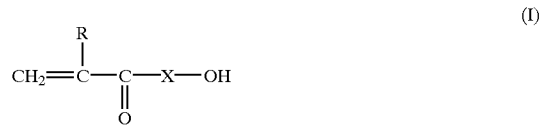

(I)

wherein R is a hydrogen atom or a methyl group, and X is an organic chain represented by the formula:

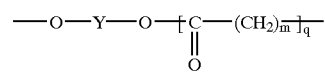

wherein Y is a linear or branched alkylene group having 2 to 8 carbon atoms, m is an integer of 3 to 7 and q is an integer of 0 to 4, or an organic chain represented by the formula:

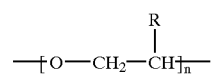

wherein R is an hydrogen atom or a methyl group and n is an integer of 2 to 50.

Examples thereof include 2-hydroxyethyl (meth)acrylate, 2-hydroxypropyl(meth)acrylate, 2-hydroxybutyl(meth) acrylate, 4-hydroxybutyl(meth)acrylate, 6-hydroxyhexyl (meth)acrylate, reaction products of these with ε-caprolactone, and compounds prepared by esterifying (meth)acrylic acid with an excess amount of diols (e.g. 1,4-butanediol, 1,6-hexanediol, polyethylene glycol, polypropylene glycol, etc.).

These compounds are commercially available, and examples thereof include 4-hydroxybutyl acrylate "4HBA" and 4-hydroxybutyl methacrylate "4HBMA" (manufactured by Mitsubishi Chemical Co., Ltd.), and "Placcel FM1" and "Placcel FA1" (manufactured by Daicel Kagaku Kogyo Co., Ltd.). Examples of a propylene oxide monomer include "Blemmer PP-1000" and "Blemmer PP-800", examples of an ethylene oxide monomer include "Blemmer PE-90", manufactured by Nippon Oil & Fat Co., Ltd.

Examples of the acid anhydride group-containing compound to be used herein include phthalic anhydride, tetrahydrophthalic anhydride, hexahydrophthalic anhydride, 4-methylhexahydrophthalic anhydride, trimellitic anhydride, succinic anhydride, etc.

The half esterification reaction between the hydroxyl group-containing ethylenically unsaturated monomer and acid anhydride group-containing compound is carried out at a temperature of room temperature to 150° C. according to a method known to the art.

The copolymerization between the acid anhydride group-containing ethylenically unsaturated monomer (a)(i)(1) and ethylenically unsaturated monomer having no acid anhydride group (a)(i)(2) is carried out by a known method such as solution polymerization (e.g. radical polymerization, etc.). For example, it can be carried out at a polymerization temperature of 100 to 200° C. for a polymerization time of 3 to 8 hours under normal or applied pressure. As an initiator, there can be suitably used an azo or peroxide initiator. Other additives such as chain transfer agent, etc. can also be used.

A number-average molecular weight of the resulting polymer is preferably 500 to 8000, more preferably 800 to 6000, particularly 1500 to 4000. When the number-average molecular weight exceeds 8000, compatibility between the resins becomes poor, which results in poor appearance of the coated film. On the other hand, when the number-average molecular weight is smaller than 500, curability of the resin composition becomes insufficient. The resulting polymer has at least two acid anhydride groups, preferably 2 to 15 acid anhydride groups, per molecule on an average. When the number of the acid anhydride groups per molecule is smaller than 2, curability of the resin composition becomes insufficient. On the other hand, when it exceeds 15, the resulting coated film becomes too hard and brittle, which results in poor weather resistance.

Then, the resulting acrylic polyacid anhydride (a)(i) is reacted with a monoalcohol (a)(ii) in a proportion so that a molar ratio of an acid anhydride group to a hydroxyl group becomes 1/10 to 1/1, preferably 1/5 to 1/1, more preferably 1/2.0 to 1/1 to prepare an acrylic polycarboxylic acid (a) having a carboxyl group and a carboxylate group. When the molar ratio is smaller than 1/10, an amount of the excessive alcohol is too large, which causes pinholes at the step of curing. On the other hand, the molar ratio exceeds 1/1, the excessive anhydride group remains in the resulting resin composition, and storage stability becomes poor.

It is preferred that the monoalcohol (a)(ii) which can be used in the present invention has 1 to 12 carbon atoms, particularly 1 to 8 carbon atoms. Such a monoalcohol evaporates when heating, and is convenient for regenerating an acid anhydride group. Examples of the preferred monoalcohol include those which have already been described. Particularly preferred examples include acetol, furfuryl alcohol, allyl alcohol, propargyl alcohol, ethanol and methanol.

The resulting acrylic polycarboxylic acid (a) having a carboxyl group and a carboxylate group has an acid value of 5 to 300 mg KOH/g, preferably 50 to 250 mg KOH/g. When the acid value is smaller than 5 mg KOH/g, curability of the resulting resin composition becomes insufficient. On the other hand, when it exceeds 300 mg KOH/g, storage stability becomes poor.

An acrylic polycarboxylic acid (a) component can be contained in an amount of 10 to 70% by weight, preferably 15 to 50% by weight, more preferably 20 to 45% by weight, based on weight of the total solid contained in the curable resin composition. When an amount of the acrylic carboxylic acid component (a) is smaller than 10% by weight, acid resistance of the resulting coated film becomes poor. On the other hand, when it exceeds 70% by weight, the coated film becomes too hard.

A polyester polycarboxylic acid (b) to be used for the curable resin composition of the present invention is obtained by subjecting a polyester polyol having 3 or more hydroxyl groups and an acid anhydride group-containing compound to the half esterification reaction.

In the present specification, the term "polyester polyol" means a polyhydric alcohol having 2 or more ester moieties. The term "polyhydric alcohol" means an alcohol having 2 or more hydroxyl groups.

The polyester polyol to be used herein reacts with an acid anhydride group-containing compound, and provides a polyester polycarboxylic acid having 2 or more acid functional groups per molecule. The polyester polycarboxylic acid has the following characteristics.

The polyester polyol is generally prepared by condensing a low-molecular weight polyhydric alcohol having 3 to 16 carbon atoms and having 3 or more hydroxyl groups, with a linear aliphatic dicarboxylic acid. As a result, a linear aliphatic group is introduced into the low-molecular weight polyhydric alcohol, thereby flexibility of the resulting coated films is improved, and impact resistance is improved.

Examples of the low-molecular weight polyhydric alcohol which can be used include trimethylolpropane, trimethylolethane, 1,2,4-butanetriol, ditrimethylolpropane, pentaerythritol, dipentaerythritol, glycerol and mixtures thereof.

Examples of the dicarboxylic acid include a dibasic acid such as phthalic acid, isophthalic acid, terephthalic acid, succinic acid, adipic acid, azelaic acid, sebacic acid, tetrahydrophthalic acid, hexahydrophthalic acid, maleic acid and fumaric acid, and mixtures thereof. There can also be used an acid anhydride group-containing compound such as succinic anhydride, phthalic anhydride, tetrahydrophthalic anhydride, hexahydrophthalic anhydride, hymic anhydride, trimellitic anhydride, methylcyclohexenetricarboxylic anhydride and pyromellitic anhydride, and mixtures thereof.

The polyester polyol is synthesized by a conventional esterification reaction. That is, polyesterification proceeds on a condensation reaction between a polyhydric alcohol and a polybasic acid, or esterification between a polyhydric alcohol and an acid anhydride group-containing compound and further dehydration with an alkyl component. A polyester oligomer having comparatively low molecular weight is obtained by the procedure, and a high-solid resin composition may be provided.

A polyester polyol which is particularly preferred to be used in the present invention is obtained by adding a lactone compound such as ε-caprolactone to the low-molecular weight polyhydric alcohol, and extending a chain of the alcohol. The resulting polyester polyol has narrow molecular weight distribution, and it may provide a high-solid resin composition and a coated film having good weather resistance and water resistance. Examples of the low-molecular weight polyhydric alcohol which is preferably used, include trimethylolpropane, di-trimethylolpropane, pentaerythritol, etc.

The "lactone compound" to be used in the present invention is a cyclic compound having an oxygen atom in the ring, and it reacts with a nucleophilic reagent to open its ring and to form a terminal hydroxyl group. Preferred lactone compound has 4 to 7 carbon atoms, because it easily react to open its ring.

Examples thereof include ε-caprolactone, γ-caprolactone, γ-valerolactone, δ-valerolactone, γ-butyrolactone, etc. Among them, ε-caprolactone, γ-valerolactone and γ-butyrolactone are preferably used.

The chain extension reaction can be carried out under the same condition as that of a conventional ring opening addition reaction. For example, a chain extended polyester polyol is derived from the low-molecular weight polyhydric alcohol, by reacting at a temperature of 80 to 200° C. in the presence or absence of a suitable solvent for 5 hours or less. A tin compound catalyst and the like may also be used.

A molar amount of the lactone compound is 0.2- to 10-fold, preferably 0.25- to 5-fold, more preferably 0.3- to 3-fold, based on a molar amount of OH group of the low-molecular weight polyhydric alcohol. When a molar amount of the lactone compound based on that of OH group is smaller than 0.2-fold, the resin becomes hard, which results in poor impact resistance of the coated film. On the other hand, when it exceeds 10-fold, hardness of the coated film becomes poor.

A polyester polycarboxylic acid (b) to be used for the curable resin composition of the present invention has an acid value of 50 to 350, preferably 100 to 300, more preferably 150 to 250 mg KOH/g (solid content), a number average-molecular weight of 400 to 3500, preferably 500 to 2500, more preferably 700 to 2000 and a ratio of weight-average molecular weight to number-average molecular weight of 1.8 or less, preferably 1.5 or less, more preferably 1.35 or less.

When the acid value exceeds 350, viscosity of the resin composition becomes too high, thereby solid content of the resin composition is lowered. On the other hand, when the acid value is smaller than 50, curability of the resin composition becomes poor. When the molecular weight exceeds 3500, viscosity of the resin composition becomes high and the handling becomes difficult, thereby solid content of the resin composition is lowered. On the other hand, when the molecular weight is smaller than 400, curability of the resin composition becomes poor or the water resistance of the coated film becomes poor. When the weight average-molecular weight/number average-molecular exceeds 1.8, water resistance or weather resistance of the coated film becomes poor.

The half esterification reaction between the polyester polyol and the acid anhydride group-containing compound can be carried out by using the acid anhydride group-containing compound such as phthalic anhydride, tetrahydrophthalic anhydride, hexahydrophthalic anhydride, 4-methylhexahydrophthalic anhydride, trimellitic anhydride, succinic anhydride, etc. under an ambient reaction condition such as room temperature to 150° C. and normal pressure. It is not necessary to convert all hydroxyl groups of the polyester polyol into carboxyl groups, but a part of the hydroxyl groups may remain.

A polyester polycarboxylic acid having a hydroxyl group provides both a carboxyl group and a hydroxyl group on a surface of the coated film. Therefore, in case of recoating, it provides excellent adhesiveness, in comparison with a polyester polycarboxylic acid having no hydroxyl group.

The polyester polycarboxylic acid (b) may have a hydroxyl value of not more than 150 mg KOH/g (solid content), preferably 5 to 100 mg KOH/g, more preferably 10 to 80 mg KOH/g. When the hydroxyl value exceeds 150 mg KOH/g, water resistance of the coated film becomes poor.

The polyester polycarboxylic acid having a hydroxyl group and a carboxyl group can react and bond with both polyepoxide (c) and acrylic polycarboxylic acid (a), and therefore, a strong coated film can be obtained. Those having 0.1 or more hydroxyl groups per molecule on an average are preferred.

It is desired that a molar amount of an acid anhydride group of the acid anhydride group-containing compound is 0.2- to 1.0-fold, particularly 0.5- to 0.9-fold based on a molar amount of OH group of the polyester polyol. When a molar amount of the acid anhydride group based on the molar amount of OH group is smaller than 0.2-fold, curability of the resulting resin composition becomes poor.

A polyester polycarboxylic acid (b) component can be contained in an amount of 5 to 70% by weight, preferably 5 to 50% by weight, more preferably 10 to 40% by weight, based on weight of the total solid contained in the curable resin composition. When an amount of the polyester polycarboxylic acid is smaller than 5% by weight, solid content of the resin composition is not increased. On the other hand, when it exceeds 70% by weight, weather resistance of the coated film becomes poor.

A polyepoxide (c) to be used for the curable resin composition of the present invention has 2 or more epoxy groups, preferably 2 to 10 epoxy groups, more preferably 3 to 8 epoxy groups per molecule on an average.

Examples thereof include a glycidyl ether of a polyhydric alcohol and a glycidyl ester of a polybasic acid, such as glycerol triglycidyl ether, trimethylolpropane triglycidyl ether, pentaerythritol tetraglycidyl ether, sorbitol hexaglycidyl ether, diglycidyl hexahydrophthalate, etc.

A number-average molecular weight of the polyepoxide is 200 to 10000, preferably 500 to 8000, more preferably 800 to 5000. When a number-average molecular weight of the acrylic polyepoxide is smaller than 200, curability of the resulting coated film becomes poor. On the other hand, when it exceeds 10000, solid content of the resulting resin composition becomes low. In addition, an epoxy equivalent is 50 to 700, preferably 80 to 600, more preferably 100 to 500. When an epoxy equivalent of the acrylic polyepoxide is larger than the above upper limit, curability of the resin composition becomes poor. On the other hand, when the epoxy equivalent is smaller than the lower limit, the coated film becomes hard and brittle, and it is not preferred.

A polyepoxide which is preferably used in the present invention is an acrylic polyepoxide obtained by copolymerizing 10 to 60% by weight, preferably 15 to 50% by weight of an epoxy group-containing ethylenically unsaturated monomer with 40 to 90% by weight, preferably 10 to 60% by weight of an ethylenically unsaturated monomer having no epoxy group. When an amount of the epoxy group-containing ethylenically unsaturated monomer is smaller than 10% by weight, curability becomes poor. On the other hand, when the amount is larger than 60% by weight, the coated film becomes too hard and weather resistance becomes poor.

Examples of the epoxy group-containing ethylenically unsaturated monomer include glycidyl (meth)acrylate, β-methylglycidyl(meth)acrylate, 3,4-epoxycyclohexanyl (meth)acrylate, etc. It is preferred to use glycidyl(meth) acrylate so as to obtain a resin composition having good balanced curability and storage stability.

Examples of the ethylenically unsaturated monomer having no epoxy group include those described above as the ethylenically unsaturated monomer having no acid anhydride group (a)(i)(2) which is used for preparing the acrylic polyacid anhydride (a)(i). The copolymerization can also be carried out according to the same manner as that described above.

A number-average molecular weight of the acrylic polyepoxide is 500 to 10000, preferably 1000 to 8000, more preferably 1500 to 5000. When a number-average molecular weight of the acrylic polyepoxide is smaller than 500, curability of the resulting coated film becomes poor. On the other hand, when it exceeds 10000, solid content of the resulting resin composition becomes low. In addition, an epoxy equivalent is 50 to 700, preferably 80 to 600, more preferably 100 to 500. When an epoxy equivalent of the acrylic polyepoxide is larger than the above upper limit, curability of the resin composition becomes poor. On the other hand, when the epoxy equivalent is smaller than the lower limit, the coated film becomes hard and brittle, and it is not preferred.

The above-described hydroxyl group-containing ethylenically unsaturated monomer which is used for preparing the ethylenically unsaturated monomer having no acid anhydride group (a)(i)(2) can also be used as the ethylenically unsaturated monomer having no epoxy group.

When using the ethylenically unsaturated monomer having a hydroxyl group as the ethylenically unsaturated monomer having no epoxy group, adhesiveness and recoating properties of the resulting coated film are improved. In addition, the acrylic polyepoxide having a hydroxyl group and a carboxylate group, which is obtained by using the ethylenically unsaturated monomer having a hydroxyl group as the ethylenically unsaturated monomer having no epoxy group, reacts and bonds with an acrylic polycarboxylic acid (a) having a carboxyl group and a carboxylate group, in both functional groups (e.g. hydroxyl group and epoxy group), as described hereinafter. Therefore, a strong coated film can be obtained.

A hydroxyl value of the resulting acrylic polyepoxide is 5 to 300 mg KOH/g, preferably 10 to 200 mg KOH/g, more preferably 15 to 150 mg KOH/g. When the hydroxyl value exceeds 300, solid content of the resin composition is lowered and water resistance of the cured coated film becomes poor. On the other hand, when it is smaller than 5, adhesiveness of the coated film becomes poor.

Particularly preferred polyepoxide (c) to be used in the present invention is obtained by copolymerizing (i) 5 to 70% by weight of a hydroxyl group-containing ethylenically unsaturated monomer having a structure represented by the formula:

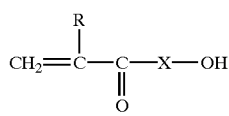

(I)

wherein R is a hydrogen atom or a methyl group, and X is
an organic chain represented by the formula:

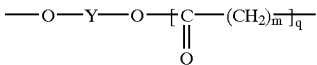

wherein Y is a linear or branched alkylene group having 2 to 8 carbon atoms, m is an integer of 3 to 7 and q is an integer of 0 to 4, or
an organic chain represented by the formula:

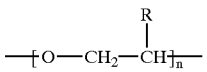

wherein R is an hydrogen atom or a methyl group and n is an integer of 2 to 50;
(ii) 10 to 60% by weight of an epoxy group-containing ethylenically unsaturated monomer; and
(iii) 0 to 85% by weight of an optional ethylenically unsaturated monomer having neither hydroxyl nor epoxy group.

The polyepoxide (c) having a hydroxyl group and an epoxy group has preferably 2 to 12 epoxy groups, more preferably 3 to 10 epoxy groups and 0.5 to 10 hydroxyl groups, more preferably 1 to 8 hydroxyl groups per molecule on an average.

A polyepoxide (c) component can be contained in an amount of 10 to 80% by weight, preferably 20 to 70% by weight, more preferably 30 to 65% by weight, based on weight of the total solid contained in the curable resin composition. When an amount of the polyepoxide is smaller than 10% by weight, curability of the resulting coated film becomes poor. On the other hand, when it exceeds 70% by weight, yellowing resistance of the coated film becomes poor.

Thus obtained acrylic polycarboxylic acid (a), polyester polycarboxylic acid (b) and polyepoxide (c) were formulated to obtain a curable resin composition of the present invention.

The formulation of the acrylic polycarboxylic acid (a), polyester polycarboxylic acid (b) and polyepoxide (c) can be carried out according to an amount and a method known to those skilled in the art. When using an acrylic polycarboxylic acid having a carboxyl group and a carboxylate group as the acrylic polycarboxylic acid (a) and using a polyepoxide having a hydroxyl group and an epoxy group as the polyepoxide (c), there can be obtained a high-solid curable resin composition which forms a coated film having good acid resistance.

In that case, it is preferred to formulate in an amount so that a molar ratio of a carboxyl group contained in the acrylic polycarboxylic acid (a) and the polyester polycarboxylic acid (b) to an epoxy group contained in the polyepoxide (c) becomes 1/1.4 to 1/0.6, preferably 1/1.2 to 1/0.8, and a molar ratio of a carboxyl group or a carboxylate group which bonds to a carbon atom adjacent to a carbon atom bonding the carboxyl group contained in the acrylic polycarboxylic acid (a) to a hydroxyl group contained in the polyester polycarboxylic acid (b) and the polyepoxide (c) becomes 1/2.0 to 1/0.5, more preferably 1/1.5 to 1/0.7.

When a ratio of a carboxyl group contained in the acrylic polycarboxylic acid (a) and the polyester polycarboxylic acid (b) to an epoxy group contained in the polyepoxide (c) exceeds 1/0.6, curability of the resulting resin composition becomes poor. On the other hand, when it is smaller than 1/1.4, the coated film may become yellow. When a ratio of a carboxyl or a carboxylate group contained in the acrylic polycarboxylic acid (a) to a hydroxyl group contained in the polyester polycarboxylic acid (b) and the polyepoxide (c) exceeds 1/0.5, curability of the resulting resin composition becomes poor. On the other hand, when it is smaller than 1/2.0, water resistance of the coated film becomes poor because of excess hydroxyl groups. An amount of each component for the formulation can be calculated from hydroxyl value, acid value and epoxy equivalent of the polymers according to the calculation method known to those skilled in the art.

Curing mechanism of a curable resin composition of the present invention thus obtained is as follows. That is, a carboxyl group and a carboxylate group in the acrylic polycarboxylic acid (a) react together by heating, and form an acid anhydride group and a free monoalcohol in the acrylic polycarboxylic acid (a). The monoalcohol evaporates and leaves from the system. The acid anhydride group formed in the acrylic polycarboxylic acid (a) reacts with a hydroxyl group contained in the polyester polycarboxylic acid (b) and the polyepoxide (c), and forms a crosslinking point and a carboxyl group again. This carboxyl group and a carboxyl group which is present in the polyester polycarboxylic acid (b) react with an epoxy group in the polyepoxide (c), and form a crosslinking point. In such way, three sorts of polymers reacts together to cure and high density of crosslinking is provided.

In addition to the above essential components, a binder component such as silicone polymer can be optionally formulated in the curable resin composition of the present invention, because it is effective for increasing solid content of the resulting resin composition.

A silicone polymer which can be used in the present invention is a silicone polymer having an epoxy group and/or an alkoxy group, which is represented by the formula:

(II)

wherein $R^1$ to $R^6$ independently represents a substituent selected from the group consisting of an alkyl group having 1 to 10 carbon atoms, a phenyl group having 1 to 10 carbon atoms, a phenethyl group having 1 to 10 carbon atoms, an alkoxy group having 1 to 5 carbon atoms and the group. represented by the formulas:

$R^7$—Si(OR$^8$)$_3$, $R^7$—Si(OR$^8$)$_2$CH$_3$, $R^7$—Si(OR$^8$)(CH$_3$)$_2$ and $R^7$—Y wherein $R^7$ represents a linear or branched alkylene group or a linear or branched alkylene group having an ether or ester moiety, $R^8$ represents an alkyl group having 1 to 5 carbon atoms, and Y represents an aliphatic or cycloalkyl group having an epoxy group,
provided that at least one of $R^1$ to $R^6$ is an alkoxy group and another at least one is epoxy group; 1 represents an integer of 1 to 20; m represents an integer of 0 to 4; and n represents an integer of 0 to 2. A sequence of each repeating unit constituting the silicone polymer may be arranged at random, and is not limited to the order of the formula (II).

Examples of a silicone polymer having an epoxy group include "NUC Silicone" series manufactured by Nippon Unicar Co., Ltd. Examples of a silicone polymer having an alkoxy group include "KC89-S" manufactured by Shin-Etsu Chemical Kogyo Co., Ltd. Examples of a silicone polymer having an epoxy group and an alkoxy group include "MKC Silicate MSEP 2" series manufactured by Mitsubishi Chemical Co., Ltd. and "NUC Silicone" series manufactured by Nippon Unicar Co., Ltd.

A method for producing the silicone polymers is described in "The 1990 Organic Silicone Material Chemical Symposium, preliminary manuscript, pages 29 to 30". An epoxy group may be pendent from an aliphatic or alicyclic hydrocarbon chain or it may be present at terminal end thereof. In the silicone polymer (II), the aliphatic or alicyclic hydrocarbon chain having an epoxy group Y is represented, for example, by the following formula:

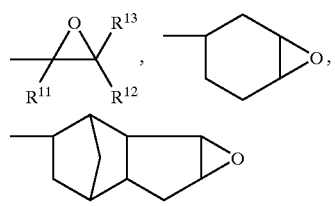

wherein $R^{11}$, $R^{12}$ and $R^{13}$ represent a hydrocarbon having up to 4 carbon atoms.

In the present specification, the term "epoxy equivalent" means a weight in grams of a compound having 1 gram equivalent of an epoxy group. The term "alkoxy equivalent" means a weight in grams of a compound having 1 gram equivalent of an alkoxy group. The term "hydroxyl equivalent" means a weight in grams of a compound having 1 gram equivalent of a hydroxyl group.

An epoxy equivalent of this silicone polymer is 100 to 1500, and an alkoxy equivalent is 50 to 1500. When the epoxy equivalent is less than 100, storage stability of the resin composition becomes poor. On the other hand, when it exceeds 1500, curability becomes poor. A preferable range of the epoxy equivalent is 140 to 1000, more preferably 180 to 700. A preferable range of the alkoxy equivalent is 60 to 800, more preferably 80 to 500.

The silicone polymer component having an epoxy group and an alkoxy group can be formulated in an amount of not more than 30% by weight, preferably 1 to 20% by weight, more preferably 3 to 15% by weight. When an amount of the silicone polymer component exceeds 30% by weight, storage stability of the resulting resin composition becomes poor.

In the present invention, a silicone polymer having a hydroxyl group and a carboxyl group can be used together with or in place of the silicone polymer component having an epoxy group and/or an alkoxy group. The silicone polymer having a hydroxyl group and a carboxyl group is obtained by subjecting a silicone polymer having a hydroxyl group and an acid anhydride group-containing compound to the half esterification reaction.

A number-average molecular weight of this silicone polymer is 500 to 6000, preferably 1000 to 4500. A hydroxyl value is 2 to 120, preferably 10 to 80. An acid value is 20 to 180, preferably 35 to 150. When the number-average molecular weight, hydroxyl value or acid value exceeds the upper limit of the above range, it becomes difficult to prepare a resin composition having satisfactory high solid content. On the other hand, when it is smaller than the lower limit, curability of the resulting resin composition becomes poor.

A silicone polymer having a hydroxyl group is commercially available, and examples thereof include KR-2001 manufactured by Shin-Etsu Chemical Co., Ltd, NUC-Silicone series manufactured by Nippon Unicar Co., Ltd., represented by the following formula:

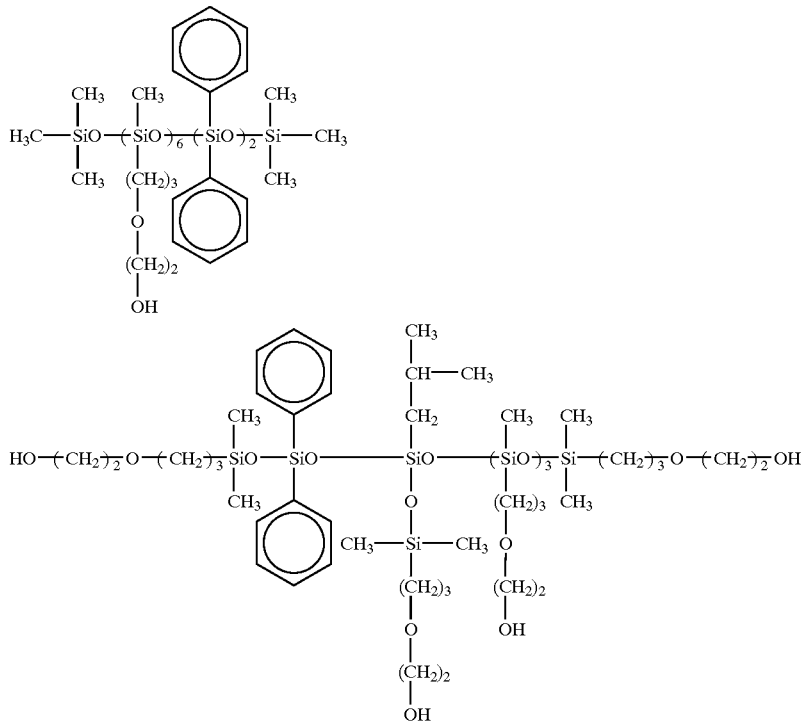

It is preferred that a silicone polymer having a hydroxyl group has 3 to 12 hydroxyl groups per molecule on an average. When the number of hydroxyl groups is less than 3, curability becomes poor. On the other hand, when it exceeds 12, viscosity becomes high and it becomes difficult to increase a solid content of the resulting resin composition.

The acid anhydride group-containing compound is half-esterified by a hydroxyl group to provide a carboxy functional group, in an ambient reaction condition such as room temperature to 150° C. under normal pressure. It is preferred to use an acid anhydride group-containing compound having 8 to 12 carbon atoms, which has a (unsaturated or saturated) cyclic group. Such a component may improve compatibility of the resulting resin.

Examples of the preferred acid anhydride group-containing compound include hexahydrophthalic anhydride, phthalic anhydride, tetrahydrophthalic anhydride, 4-methyl hexahydrophthalic anhydride, trimellitic anhydride, etc.

The half esterification reaction between the hydroxyl group-containing silicone polymer and the acid anhydride group-containing compound is carried out at a temperature of room temperature to 120° C. for 30 minutes to 8 hours according to a conventional procedure. When the reaction is carried out for a long period of time at a temperature of more than 120° C., a polyesterification reaction occurs and a high-molecular weight silicone polyester may be formed. Since such a high-molecular weight silicone polyester has small amount of functional groups and has high viscosity, it is not preferred to use in the present invention.

A silicone polymer component having a hydroxyl group and a carboxyl group can be formulated in an amount of not more than 30% by weight, preferably 1 to 20% by weight, more preferably 3 to 15% by weight. When an amount of the silicone polymer component exceeds 30% by weight, storage stability of the resulting resin composition becomes poor.

When a silicone polymer component having an epoxy group and an alkoxy group and a silicone polymer component having a hydroxyl group and a carboxyl group is used in combination, they can be formulated in an amount that the sum of them is not more than 30% by weight, preferably 1 to 20% by weight, more preferably 3 to 15% by weight based on weight of the total solid contained in the curable resin composition. When an amount of the silicone polymer component exceeds 30% by weight, storage stability of the resulting resin composition becomes poor.

In addition to the above components, a curable resin composition of the present invention may contain a curing catalyst which is generally used for the esterification reaction between an acid and an epoxy, such as quaternary ammonium salts. Examples of the other catalyst which can be used for a curable resin composition of the present invention include benzyltriethylammonium chloride or bromide, tetrabutylammonium chloride, bromide, salicylate or glycolate, paratoluenesulfonate, etc. These curing catalysts may be used in combination thereof.

A curing catalyst is generally used in an amount of 0.01 to 3.0 by weight, preferably 0.1 to 1.5% by weight, more preferably 0.4 to 1.2% by weight. When an amount of the curing catalyst is smaller than 0.01% by weight, curability becomes poor. On the other hand, when it exceeds 3.0% by weight, storage stability becomes poor.

In addition, a tin compound may be used in combination with these catalysts, as is described in Japanese Laid-Open Patent Publication Nos. 2-151651 and 2-279713. Examples of the tin catalyst include dimethyltin bis-(methyl maleate), dimethyltin bis-(ethyl maleate), dimethyltin bis-(butyl maleate), dibutyltin bis-(butyl maleate), etc.

The tin compound can be generally used in an amount of 0.05 to 6.0% by weight, preferably 0.1 to 4.0% by weight, more preferably 0.2 to 2.0% by weight. When an amount of the tin compound is smaller than 0.05% by weight, storage stability becomes poor. On the other hand, when it exceeds 6.0% by weight, weather resistance becomes poor. When the curing catalyst and the tin compound are used in combination, it is preferred that the weight ratio of the curing catalyst to the tin compound is 1/4 to 1/0.2.

In order to increase crosslinking density and to improve water resistance, a blocked isocyanate may be added to a resin composition of the present invention. In order to improve weather resistance of the coated film, an ultraviolet absorber, a hindered amine photostabilizer and an antioxidant may be added. Crosslinked resin particles for controlling rheology, and a surface modifier for modifying appearance of the coated film may also be added. Furthermore, in order to control viscosity, alcoholic solvents (e.g. methanol, ethanol, propanol, butanol, etc.) and hydrocarbon and ester solvents may be used.

When the crosslinked resin particles are used, they are added in an amount of 0.01 to 10 parts by weight, preferably 0.1 to 5 parts by weight, based on 100 parts by weight of the resin solid of the curable resin composition of the present invention. When an amount of the crosslinked resin particles exceeds 10 parts by weight, appearance of the coated film becomes poor. On the other hand, when it is smaller than 0.01 parts by weight, no rheology controlling effect is obtained.

A resin to be used in the present invention has an acid group as a functional group. Accordingly, it is also possible to prepare an aqueous resin composition comprising water as a medium by neutralizing the acid group with amine.

The present invention also provides a coating composition comprising above-described curable resin composition as a binder component. A method for preparing the coating composition of the present invention is not specifically limited, and there can be used all methods which are known to those skilled in the art.

A coating composition of the present invention can be coated by spray coating, brush coating, dip coating, roll coating, curtain coating, etc. A substrate may be optionally undercoated or intercoated. A known coating composition can be used for undercoating or intercoating the substrate.

A coating composition of the present invention can be advantageously used for any substrate such as wood, metal, glass, fabric, plastic, foam, etc., particularly plastic and surface of metal such as steel, aluminum and alloys thereof. Generally, thickness of the coated film varies depending on the desired application. A film thickness of 0.5 to 3 mills is useful in almost all cases.

After applying the coating composition on the substrate, the resulting coating is cured. High crosslinking density is formed by curing at 100 to 180° C., preferably 120 to 160° C. A curing time varies depending on a curing temperature used, but is usually for 10 to 30 minutes at 120 to 160° C.

In one preferred embodiment of the present invention, a coated film is provided according to the process which comprises the steps of:

applying a water-based or solvent-based coating composition on an undercoated or intercoated substrate to form a base coating;

applying a clear coating composition comprising an acrylic polycarboxylic acid, a polyester polycarboxylic acid and a polyepoxide as a binder thereon to form a clear coating, without curing the base coating; and heating and curing both the base coating and clear coating.

As described above, according to the present invention, there is provided a high-solid content coating composition which is superior in acid rain resistance, mar resistance and appearance.

EXAMPLES

The following Synthetic Examples, Examples and Comparative Examples further illustrate the present invention in detail but are not to be construed to limit the scope thereof. In the Synthesis Examples, Examples and Comparative Examples, "parts" are by weight unless otherwise stated.

Synthetic Example 1

Synthesis of Acrylic Polycarboxylic Acid (a)-1

700 Parts of xylene and 500 parts of Solvesso 100 (aromatic hydrocarbon solvent, manufactured by Esso Co.) were charged in a 3 L reaction vessel equipped with a thermometer, a stirrer, a cooling tube, a nitrogen introducing tube and a dropping funnel, and were heated to 130° C. To the vessel, a monomer solution consisting of 300 parts of styrene monomer, 350 parts of 2-ethylhexyl acrylate, 150 parts of isobutyl methacrylate and 200 parts of acrylic acid, and an initiator solution consisting of 150 parts of t-butylperoxy-2-ethyl hexanoate and 300 parts of xylene were added dropwise over 3 hours, respectively. After that, the reaction vessel was maintained at 130° C. for 30 minutes, and an initiator solution consisting of 20 parts of t-butylperoxy-2-ethyl hexanoate and 20 parts of xylene was added dropwise over 30 minutes. After an end of addition, the reaction was continued at 130° C. for additional one hour and 1100 parts of solvent was removed to obtain a varnish having a nonvolatile content of 70%, which contains an acrylic polycarboxylic acid (a)-1 having a number-average molecular weight of 1800 and an acid value of 156 mg KOH/g (solid content).

Synthetic Example 2

Synthesis of Acrylic Polycarboxylic Acid (a)-2

According to the same manner as that described in Synthetic Example 1 except for using the components shown in the following Table 1, a varnish having a nonvolatile content of 70%, which contains an acrylic polycarboxylic acid (a)-2 having a number-average molecular weight of 1900 and an acid value of 140 mg KOH/g.

TABLE 1

| Component | Amount (parts) |
| --- | --- |
| Styrene | 300 |
| Methyl methacrylate | 122 |
| n-Butyl acrylate | 250 |
| Acrylic acid | 128 |
| 1:1 Adduct of 2-hydroxyethyl methacrylate and hexahydrophthalic anhydride | 200 |
| Xylene | 1020 |
| Solvesso 100 | 500 |
| t-Butylperoxy-2-ethyl hexanoate | 170 |
| Removed solvent | 1100 |

Synthetic Example 3

Synthesis of Acrylic Polycarboxylic Acid (a)-3

According to the same manner as that described in Synthetic Example 1 except for using the components shown in the following Table 2, a varnish having a nonvolatile content of 70%, which contains an acrylic polycarboxylic acid (a)-3 having a number-average molecular weight of 1800 and an acid value of 150 mg KOH/g.

TABLE 2

| Component | Amount (parts) |
| --- | --- |
| Styrene | 300 |
| 2-Ethylhexyl acrylate | 352 |
| 1:1 Adduct of maleic anhydride and methanol | 348 |
| Xylene | 1020 |
| Solvesso 100 | 500 |
| t-Butylperoxy-2-ethyl hexanoate | 170 |
| Removed solvent | 1100 |

Synthetic Example 4

Synthesis of Acrylic Polycarboxylic Acid (a)-4 Having Carboxyl Group and Carboxylate Group 700 Parts of xylene and 350 parts of Solvesso 100 were charged in a 3 L reaction vessel equipped with a thermometer, a stirrer, a cooling tube, a nitrogen introducing tube and a dropping funnel, and were heated to 130° C. To the vessel, a monomer solution consisting of 300 parts of styrene, 109 parts of 2-ethylhexyl methacrylate, 325 parts of isobutyl acrylate, 26 parts of acrylic acid, 240 parts of maleic anhydride and 300 parts of propylene glycol monomethyl ether acetate, and an initiator solution consisting of 150 parts of t-butylperoxy-2-ethyl hexanoate and 150 parts of xylene were added dropwise over 3 hours, respectively. After that, the reaction vessel was maintained at 130° C. for 30 minutes, and an initiator solution consisting of 20 parts of t-butylperoxy-2-ethyl hexanoate and 20 parts of xylene were added dropwise over 30 minutes. After an end of addition, the reaction was continued at 130° C. for additional one hour and 1100 parts of solvent was removed to obtain a varnish having a nonvolatile content of 70%, which contains an acrylic polyacid anhydride (a)(i) having a number-average molecular weight of 2000.

To 1590 parts of the resulting varnish, 125 parts of methanol was added and the resulting mixture was reacted at 70° C. for 23 hours to obtain a varnish containing an acrylic polycarboxylic acid (a)-4 having an acid value of 158 mg KOH/g. An infrared absorption spectrum of the acrylic polycarboxylic acid (a)-4 was measured and confirmed that an absorption (1785 cm$^{-1}$) belongs to an acid anhydride group is not present.

Synthetic Example 5

Synthesis of Acrylic Polycarboxylic Acid (a)-5 Having Carboxyl Group and Carboxylate Group According to the same manner as that described in Synthetic Example 4 except for using the components shown in the following Table 3, a varnish having a nonvolatile content of 65%, which contains an acrylic polycarboxylic acid (a)-5 having a number-average molecular weight of 2000 and an acid value of 165 mg KOH/g.

TABLE 3

| Component | Amount (parts) |
| --- | --- |
| Styrene | 300 |
| 2-Ethylhexyl acrylate | 423 |
| Methacrylic acid | 77 |
| Maleic anhydride | 200 |
| Methanol | 105 |
| Xylene | 870 |
| Solvesso 100 | 350 |
| Propylene glycol monomethyl ether acetate | 300 |
| t-Butylperoxy-2-ethyl hexanoate | 170 |
| Removed solvent | 1000 |

Synthetic Example 6

Synthesis of Acrylic Polycarboxylic Acid (a)-6 Having Carboxyl Group and Carboxylate Group According to the same manner as that described in Synthetic Example 4 except for using the components shown in the following Table 4, a varnish having a nonvolatile content of 65%, which contains an acrylic polycarboxylic acid (a)-6 having a number-average molecular weight of 2100 and an acid value of 157 mg KOH/g.

TABLE 4

| Component | Amount (parts) |
| --- | --- |
| Styrene | 300 |
| 2-Ethylhexyl methacrylate | 100 |
| Isobutyl acrylate | 286 |
| Itaconic anhydride | 314 |
| Methanol | 135 |
| Xylene | 870 |
| Solvesso 100 | 350 |
| Propylene glycol monomethyl ether acetate | 320 |
| t-Butylperoxy-2-ethyl hexanoate | 170 |
| Removed solvent | 1000 |

Synthetic Example 7

Synthesis of Polyester Polycarboxylic Acid (b)-1

278 Parts of ethyl 3-ethoxypropionate, 268 parts of trimethylolpropane, 228 parts of ε-caprolactone and 0.1 parts of dibutyltin oxide were charged in a reaction vessel equipped with a thermometer, a stirrer, a cooling tube and a nitrogen introducing tube, and were heated to 150° C.

After maintaining at 150° C. for 2 hours, 616 parts of hexahydrophthalic anhydride which was melted by heating was added and the resulting mixture was maintained at 150° C. for one hour. A varnish having a nonvolatile content of 80%, which contains a polyester polycarboxylic acid (b)-1 having a number-average molecular weight of 800, a ratio of weight-average molecular weight to number-average molecular weight of 1.18, an acid value of 202 mg KOH/g (solid content) and a hydroxyl value of 101 mg KOH/g (solid content) was obtained.

Synthetic Example 8

Synthesis of Polyester Polycarboxylic Acid (b)-2

271 Parts of ethyl 3-ethoxypropionate, 268 parts of trimethylolpropane, 200 parts of δ-valerolactone and 0.1 parts of dibutyltin oxide were charged in a reaction vessel equipped with a thermometer, a stirrer, a cooling tube and a nitrogen introducing tube, and were heated to 150° C.

After maintaining at 150° C. for 2 hours, 616 parts of hexahydrophthalic anhydride which was melted by heating was added and the resulting mixture was maintained at 150°

C. for one hour. A varnish having a nonvolatile content of 80%, which contains a polyester polycarboxylic acid (b)-2 having a number-average molecular weight of 800, a ratio of weight-average molecular weight to number-average molecular weight of 1.17, an acid value of 207 mg KOH/g (solid content) and a hydroxyl value of 103 mg KOH/g (solid content) was obtained.

Synthetic Example 9

Synthesis of Polyester Polycarboxylic Acid (b)-3

234 Parts of ethyl 3-ethoxypropionate, 134 parts of trimethylolpropane, 342 parts of ε-caprolactone and 0.1 parts of dibutyltin oxide were charged in a reaction vessel equipped with a thermometer, a stirrer, a cooling tube and a nitrogen introducing tube, and were heated to 150° C.

After maintaining at 150° C. for 2 hours, 462 parts of hexahydrophthalic anhydride which was melted by heating was added and the resulting mixture was maintained at 150° C. for one hour. A varnish having a nonvolatile content of 80%, which contains a polyester polycarboxylic acid (b)-3 having a number-average molecular weight of 1200, a ratio of weight-average molecular weight to number-average molecular weight of 1.22 and an acid value of 179 mg KOH/g (solid content) was obtained.

Synthetic Example 10

Synthesis of Polyester Polycarboxylic Acid (b)-4

275 Parts of ethyl 3-ethoxypropionate, 136 parts of pentaerythritol, 228 parts of ε-caprolactone and 0.1 parts of dibutyltin oxide were charged in a reaction vessel equipped with a thermometer, a stirrer, a cooling tube and a nitrogen introducing tube, and were heated to 180° C.

After maintaining at 180° C. for 2 hours, 462 parts of hexahydrophthalic anhydride which was melted by heating was added and the resulting mixture was maintained at 150° C. for one hour. A varnish having a nonvolatile content of 75%, which contains a polyester polycarboxylic acid (b)-4 having a number-average molecular weight of 1100, a ratio of weight-average molecular weight to number-average molecular weight of 1.20, an acid value of 204 mg KOH/g (solid content) and a hydroxyl value of 68 mg KOH/g (solid content) was obtained.

Synthetic Example 11

Synthesis of Polyester Polycarboxylic Acid (b)-5

136 parts of pentaerythritol, 912 parts of ε-caprolactone and 0.2 parts of dibutyltin oxide were charged in a reaction vessel equipped with a thermometer, a stirrer, a cooling tube and a nitrogen introducing tube, and were heated to 180° C.

After maintaining at 180° C. for 2 hours, 397 parts of ethyl 3-ethoxypropionate was added and then 538 parts of hexahydrophthalic anhydride which was melted by heating was added and the resulting mixture was maintained at 150° C. for one hour. A varnish having a nonvolatile content of 80%, which contains a polyester polycarboxylic acid (b)-5 having a number-average molecular weight of 2500, a ratio of weight-average molecular weight to number-average molecular weight of 1.35, an acid value of 124 mg KOH/g (solid content) and a hydroxyl value of 25 mg KOH/g (solid content) was obtained.

Synthetic Example 12

Synthesis of Polyester Polycarboxylic Acid (b)-6

275 Parts of ethyl 3-ethoxypropionate, 136 parts of pentaerythritol, 456 parts of ε-caprolactone and 0.1 parts of dibutyltin oxide were charged in a reaction vessel equipped with a thermometer, a stirrer, a cooling tube and a nitrogen introducing tube, and were heated to 180° C.

After maintaining at 180° C. for 2 hours, 576 parts of trimellitic anhydride was added and the resulting mixture was maintained at 150° C. for one hour. A varnish having a nonvolatile content of 75%, which contains a polyester polycarboxylic acid (b)-6 having a number-average molecular weight of 1800, a ratio of weight-average molecular weight to number-average molecular weight of 1.25, an acid value of 192 mg KOH/g (solid content) and a hydroxyl value of 48 mg KOH/g (solid content) was obtained.

Synthetic Example 13

Synthesis of Polyester Polycarboxylic Acid (b)-7

136 Parts of pentaerythritol, 912 parts of ε-caprolactone and 0.2 parts of dibutyltin oxide were charged in a reaction vessel equipped with a thermometer, a stirrer, a cooling tube and a nitrogen introducing tube, and were heated to 180° C.

After maintaining at 180° C. for 2 hours, 215 parts of ethyl 3-ethoxypropionate and 154 parts of hexahydrophthalic anhydride which was melted by heating were added and the resulting mixture was maintained at 150° C. for one hour. A varnish having a nonvolatile content of 80%, which contains a polyester polycarboxylic acid (b)-7 having a number-average molecular weight of 2200, a ratio of weight-average molecular weight to number-average molecular weight of 1.32, an acid value of 47 mg KOH/g (solid content) and a hydroxyl value of 140 mg KOH/g (solid content) was obtained.

Synthetic Example 14

Synthesis of Polyester Polycarboxylic Acid (b)-8

210 Parts of isophthalic acid, 370 parts of azelaic acid, 400 parts of trimethylolpropane, 100 parts of neopentyl glycol and 50 parts of Cardula E (manufactured by Shell Chemical Co.) were charged in a reaction vessel equipped with a thermometer, a stirrer, a cooling tube, a nitrogen introducing tube, a water separator, and a fractionating tower, and were heated. When the raw materials dissolved and it became possible to stir, 0.2 parts of dibutyltin oxide was added and the reaction vessel was stirred and heated to 220° C. Provided that, heating from 180 to 220° C. was conducted at a constant rate over 3 hours. A condensed water was distilled to remove from the system. When a temperature became 220° C., the reaction vessel was maintained at the temperature for one hour, and 30 parts of xylene as a reflux solvent was slowly added in the reaction vessel, and the condensation reaction was continued in the presence of the solvent. When an acid value of the resin reached 10.0, the reaction vessel was cooled to 150° C. Then, the reaction vessel was added 420 parts of phthalic anhydride, maintained at the temperature for one hour, and cooled to 100° C. After that, 275 parts of ethyl 3-ethoxypropionate and 275 parts of butyl acetate were added to obtain a varnish having a nonvolatile content of 70%, which contains a polyester polycarboxylic acid (b)-8 having a number-average molecular weight of 4200, a ratio of weight-average molecular weight to number-average molecular weight of 3.3 and an acid value of 115 mg KOH/g (solid content).

Synthetic Example 15

Synthesis of Polyepoxide (c)-1

250 Parts of xylene and 200 parts of propylene glycol monomethyl ether acetate were charged in a 2 L reaction vessel equipped with a thermometer, a stirrer, a cooling tube, a nitrogen introducing tube and a dropping funnel, and were heated to 130° C.

To the reaction vessel, a monomer solution consisting of 450 parts of glycidyl methacrylate, 236 parts of isobornyl methacrylate, 64 parts of 4-hydroxybutyl acrylate and 250 parts of t-butylstyrene, and an initiator solution consisting of 110 parts of t-butylperoxy-2-ethyl hexanoate and 150 parts of xylene were added dropwise over 3 hours, respectively.

After that, the reaction vessel was maintained at 130° C. for 30 minutes, and an initiator solution consisting of 10 parts of t-butylperoxy-2-ethyl hexanoate and 50 parts of xylene was added dropwise over 30 minutes.

After an end of addition, the reaction was continued at 130° C. for additional one hour and 270 parts of solvent was removed to obtain a varnish having a nonvolatile content of 72%, which contains an acrylic polyepoxide (c)-1 having a number-average molecular weight of 2200, an epoxy equivalent of 316 and a hydroxyl value of 25 mg KOH/g (solid content).

Synthetic Example 16

Synthesis of Polyepoxide (c)-2

250 Parts of xylene and 200 parts of propylene glycol monomethyl ether acetate were charged in a 2 L reaction vessel equipped with a thermometer, a stirrer, a cooling tube, a nitrogen introducing tube and a dropping funnel, and were heated to 135° C.

To the reaction vessel, a monomer solution consisting of 500 parts of glycidyl methacrylate, 250 parts of isobutyl methacrylate and 250 parts of t-butylstyrene, and an initiator solution consisting of 120 parts of t-butylperoxy-2-ethyl hexanoate and 140 parts of xylene were added dropwise over 3 hours, respectively.

After that, the reaction vessel was maintained at 135° C. for 30 minutes and an initiator solution consisting of 10 parts of t-butylperoxy-2-ethyl hexanoate and 50 parts of xylene were added dropwise over 30 minutes.

After an end of addition, the reaction was continued at 135° C. for additional one hour and 270 parts of solvent was removed to obtain a varnish having a nonvolatile content of 72%, which contains an acrylic polyepoxide (c)-2 having a number-average molecular weight of 1800 and an epoxy equivalent of 284.

Synthetic Example 17

Synthesis of Polyepoxide (c)-3

250 Parts of xylene and 200 parts of propylene glycol monomethyl ether acetate were charged in a 2 L reaction vessel equipped with a thermometer, a stirrer, a cooling tube, a nitrogen introducing tube and a dropping funnel, and were heated to 130° C.

To the reaction vessel, a monomer solution consisting of 550 parts of 3,4-epoxycyclohexylmethyl methacrylate, 130 parts of isobornyl acrylate, 70 parts of 2-hydroxyethyl methacrylate and 250 parts of t-butylstyrene, and an initiator solution consisting of 110 parts of t-butylperoxy-2-ethyl hexanoate and 150 parts of xylene were added dropwise over 3 hours, respectively.

After that, the reaction vessel was maintained at 130° C. for 30 minutes, and an initiator solution consisting of 10 parts of t-butylperoxy-2-ethyl hexanoate and 50 parts of xylene was added dropwise over 30 minutes.

After an end of addition, the reaction was continued at 130° C. for additional one hour and 270 parts of solvent was removed to obtain a varnish having a nonvolatile content of 72%, which contains an acrylic polyepoxide (c)-3 having a number-average molecular weight of 2200, an epoxy equivalent of 357 and a hydroxyl value of 30 mg KOH/g (solid content).

Synthetic Example 18

Synthesis of Polyepoxide (c)-4

700 Parts of xylene and 525 parts of propylene glycol monomethyl ether acetate were charged in a 3 L reaction vessel equipped with a thermometer, a stirrer, a cooling tube, a nitrogen introducing tube and a dropping funnel, and were heated to 130° C.

To the reaction vessel, a monomer solution consisting of 200 parts of Veova 9, 300 parts of glycidyl methacrylate, 230 parts of 4-hydroxybutyl acrylate and 340 parts of cyclohexyl methacrylate, and an initiator solution consisting of 120 parts of t-butylperoxy-2-ethyl hexanoate and 200 parts of xylene were added dropwise over 3 hours, respectively.

After that, the reaction vessel was maintained at 130° C. for 30 minutes, and an initiator solution consisting of 10 parts of t-butylperoxy-2-ethyl hexanoate and 50 parts of xylene was added dropwise over 30 minutes.

After an end of addition, the reaction was continued at 130° C. for additional one hour and 1200 parts of solvent was removed to obtain a varnish having a nonvolatile content of 77%, which contains an acrylic polyepoxide (c)-4 having a number-average molecular weight of 1800, an epoxy equivalent of 473 and a hydroxyl value of 90 mg KOH/g (solid content).

Synthetic Example 19

Synthesis of Polyepoxide (c)-5

250 Parts of xylene and 300 parts of propylene glycol monomethyl ether acetate were charged in a 2 L reaction vessel equipped with a thermometer, a stirrer, a cooling tube, a nitrogen introducing tube and a dropping funnel, and were heated to 135° C.

To the reaction vessel, a monomer solution consisting of 355 parts of glycidyl methacrylate, 90 parts of isobutyl methacrylate, 250 parts of t-butylstyrene, 238 parts of 4-hydroxybutyl acrylate and 67 parts of 2-hydroxyethyl methacrylate, and an initiator solution consisting of 140 parts of t-butylperoxy-2-ethyl hexanoate and 100 parts of xylene were added dropwise over 3 hours, respectively.

After that, the reaction vessel was maintained at 135° C. for 30 minutes, and an initiator solution consisting of 10 parts of t-butylperoxy-2-ethyl hexanoate and 30 parts of xylene was added dropwise over 30 minutes.

After an end of addition, the reaction was continued at 135° C. for additional one hour and 320 parts of solvent was removed to obtain a varnish having a nonvolatile content of 72%, which contains an acrylic polyepoxide (c)-5 having a number-average molecular weight of 1800, an epoxy equivalent of 400 and a hydroxyl value of 122 mg KOH/g.

Synthetic Example 20

Synthesis of Acrylic Polycarboxylic Acid (a)-7 Having Carboxyl Group and Carboxylate Group 330 Parts of xylene and 100 parts of propylene glycol monomethyl ether acetate were charged in a 3 L reaction vessel equipped with a thermometer, a stirrer, a cooling tube, a nitrogen introducing tube and a dropping funnel, and were heated to 130° C.

To the vessel, a monomer solution consisting of 300 parts of styrene, 120 parts of 2-ethylhexyl methacrylate, 369 parts of 2-ethylhexyl acrylate, 26 parts of acrylic acid, 185 parts of maleic anhydride and 300 parts of propylene glycol monomethyl ether acetate, and an initiator solution consisting of 100 parts of t-butylperoxy-2-ethyl hexanoate and 100 parts of xylene were added dropwise over 3 hours, respectively.

After that, the reaction vessel was maintained at 130° C. for 30 minutes, and an initiator solution consisting of 10 parts of t-butylperoxy-2-ethyl hexanoate and 60 parts of xylene was added dropwise over 30 minutes.

After an end of addition, the reaction was continued at 130° C. for additional one hour to obtain a varnish having a nonvolatile content of 52%, which contains an acrylic polyacid anhydride (a)(i) having a number-average molecular weight of 3000.

To 2000 parts of the resulting varnish, 90 parts of methanol was added and the mixture was reacted at 70° C. for 23 hours to obtain a varnish containing an acrylic polycarboxylic acid (a)-7 having an acid value of 126 mg KOH/g. An infrared absorption spectrum of the acrylic polycarboxylic acid (a)-7 was measured and confirmed that an absorption (1785 cm$^{-1}$) belongs to an acid anhydride group is not present.

Synthetic Example 21

Synthesis of Polyepoxide (c)-7

520 Parts of xylene and 50 parts of propylene glycol monomethyl ether acetate were charged in a 3 L reaction vessel equipped with a thermometer, a stirrer, a cooling tube, a nitrogen introducing tube and a dropping funnel, and were heated to 126° C.

To the reaction vessel, a monomer solution consisting of 250 parts of styrene, 379 parts of glycidyl methacrylate, 243 parts of isobornyl methacrylate and 128 parts of 4-hydroxybutyl acrylate, and an initiator solution consisting of 110 parts of t-butylperoxy-2-ethyl hexanoate and 110 parts of xylene were added dropwise over 3 hours, respectively.

After that, the reaction vessel was maintained at 126° C. for 30 minutes, and an initiator solution consisting of 10 parts of t-butylperoxy-2-ethyl hexanoate and 20 parts of xylene was added dropwise over 30 minutes.

After an end of addition, the reaction was continued at 126° C. for additional one hour to obtain a varnish having a nonvolatile content of 58%, which contains an acrylic polyepoxide (c)-7 having a number-average molecular weight of 3000, an epoxy equivalent of 375 and a hydroxyl value of 90 mg KOH/g (solid content).

Example 1

Preparation of Crosslinked Resin Particles

213 Parts of bishydroxyethyl taurine, 208 parts of neopentyl glycol, 296 parts of phthalic anhydride, 376 parts of azelaic acid and 30 parts of xylene were charged in a reaction vessel equipped with a stirring and heating device, a thermometer, a nitrogen introducing tube, a cooling tube and a decanter, and were heated. Water formed by the reaction was removed by azeotropic distillation with xylene. A reaction mixture in the vessel was heated to 210° C. over about 3 hours from the beginning of reflux, and was stirred and dehydrated until an acid value corresponding to carboxylic acid became 135. The reaction mixture was then cooled to 140° C., and added dropwise 500 parts of "Cardula E10" (versatic acid glycidyl ester manufactured by Shell Chemical Co.) over 30 minutes. Thereafter, the reaction was continued with stirring for 2 hours. An amphoteric ionic group-containing polyester resin having an acid value (solid content) of 55, a hydroxyl value of 91 and a number-average molecular weight of 1250 was obtained.

10 Parts of the amphoteric ionic group-containing polyester resin, 140 parts of deionized water, 1 part of dimethylethanolamine, 50 parts of styrene and 50 parts of ethylene glycol dimethacrylate were stirred vigorously in a stainless steel beaker to prepare a monomer suspension. In addition, 0.5 parts of azobiscyanovaleric acid, 40 parts of deionized water and 0.32 parts of dimethylethanolamine were mixed to prepare an initiator aqueous solution.

To a reaction vessel equipped with a stirring and heating device, a thermometer, a nitrogen introducing tube and a cooling tube, 5 parts of the amphoteric ionic group-containing polyester resin, 280 parts of deionized water and 0.5 part of dimethylethanolamine and the mixture was heated to 80° C. The monomer suspension and 40.82 parts of the initiator aqueous solution were added dropwise, simultaneously, over 60 minutes, and the reaction was continued for 60 minutes and terminated. An emulsion of crosslinked resin particles having a particle size of 55 nm measured by a dynamic light scattering method was obtained.

Xylene was added to the emulsion and water was removed by azeotropic distillation under reduced pressure to obtain a xylene solution of crosslinked resin particles having a solid content of 20% by weight.

Preparation of Clear Coating Composition

According to the formulation shown in Table 3, the acrylic polycarboxylic acid (a)-1 obtained in Synthetic Example 1, the polyester polycarboxylic acid (b)-1 obtained in Synthetic Example 7, the polyepoxide (c)-1 obtained in Synthetic Example 15, 0.5 parts of a tetrabutylammonium bromide curing catalyst, 0.5 parts of a dibutyltin bis-(butyl malate) curing catalyst, 2 parts of an ultraviolet absorber "Tinubin 900" manufactured by Ciba Geigy Co., 1 part of a photostabilizer "Sanol LS-440" manufactured by Sankyo Co., Ltd. and 0.1 parts of a surface modifier "Modaflow" manufactured by Monsanto Co. were formulated with dispersing and stirring to prepare a curable resin composition. 10 Parts of the xylene solution of crosslinked resin particles prepared as described above was added to the resulting resin composition and viscosity was adjusted to 30 seconds/#4 Ford cup using a solvent of butyl acetate and xylene (1:1) to obtain a clear coating composition.

Nonvolatile Content (NV) of Coating Composition

Viscosity of the coating composition was adjusted to 30 seconds at 20° C. using a #4 Ford cup, 0.5 g of the coating composition was weighed precisely and diluted with 3 cc of toluene. The resulting coating composition was baked at 110° C. for one hour, and nonvolatile content of the coating composition (% by weight) was determined.

On the other hand, a coated test plate was prepared by coating a phosphated steel plate having a thickness of 0.8 mm with a cationic electrodeposition coating composition (Powertop U-50, manufactured by Nippon Paint Co., Ltd.) and an intermediate coating composition (Orga P-2, manufactured by Nippon Paint Co., Ltd.) so that a dry thickness became 25 and 40 μm, respectively.

The coated test plate was then coated by air spraying with a solvent type high-solid base coating composition (manufactured by Nippon Paint Co., Ltd.) so that a dry thickness became about 16 m, followed by setting for about 7 minutes to form a base coated film.

The clear coating composition obtained was coated thereon using an electrodeposition coating device ("Auto Rea", manufactured by Lansberg Gema Co.) at an atomizing pressure of 5 kg/cm² so that a dry thickness became about 40 μm, followed by setting for about 7 minutes and baking at 140° C. for 25 minutes.

Meanwhile, a formulation of the solvent type high-solid base coating composition is 20 parts of an acrylic resin (nonvolatile content 80%, hydroxyl value 100, acid value 30, number-average molecular weight 1800) manufactured by Nippon Paint Co., Ltd., 30 parts of a polyester (nonvolatile content 80%, hydroxyl value 100, acid value 12, number-average molecular weight 2600) manufactured by Nippon Paint Co., Ltd., 40 parts of a melamine resin "Cymel 202" (nonvolatile content 80%) manufactured by Mitsui Cytec Co., Ltd., 10 parts of a melamine resin "Cymel 327" (nonvolatile content 90%) manufactured by Mitsui Cytec Co., Ltd., "Alpaste Al 60-600" (nonvolatile content 65%) manufactured by Toyo Aluminum Co., Ltd. and 7 parts of isopropyl alcohol.

Performances of the resulting coated film were evaluated as follows. The results are shown in Table 6.

Pencil Hardness

It was measured according to JIS K5400 8, 4.2.

Water Resistance

The coated film was dipped in tap water of 40° C. for 10 days, and a surface of the coated film was visually evaluated according to the following criteria.

○: No change is recognized.

Δ: A trace is slightly recognized.

x: An abnormality is recognized on the coated film.

Mar Resistance

A flannel fabric (2×2 cm) was coated with 1 g of 50% aqueous dispersion of a cleanser (abrasive 87%, surfactant 5%, etc, "Newfoaming Cleanser" manufactured by Kao Co., Ltd.). The coated flannel fabric was mounted on a sliding head of a Gakushin type rubbing testing machine for dyeing fastness (manufactured by Daiei Kagaku Seiki Co., Ltd.). The sliding head was loaded with 500 g weight and it was moved back and forth 20 times on the cured coated film, the 20° gloss of the rubbed surface was measured. A gloss retention (%) was calculated.

Acid Resistance

The coated film was contacted with 0.5 ml of 1 wt % aqueous sulfuric acid at 75° C. for 30 minutes. A surface of the coated film was visually evaluated according to the following criteria.

5: No change is recognized.

4: A mark is slightly recognized.

3: A mark is clearly recognized.

2: Several aggregates of fine pores are recognized.

1: Several aggregates of fine pores are recognized on the total surface.

Weather Resistance

A combination of irradiating the coated film with ultraviolet of 100 mW/cm² under a humidity of 70% at a black panel temperature of 63° C. for 24 hours and storing it under a humidity of 100% at a black panel temperature of 50° C. for 24 hours was repeated 5 times, by using an "Eye super UV tester SUV-W13" manufactured by Iwasaki Denki Co., Ltd. A surface of the coated film was visually evaluated according to the following criteria.

○: No change is recognized.

Δ: A cracking is slightly recognized.

x: A cracking is drastically recognized.

Adhesiveness (Non-Sand Recoat Properties)

A surface of a plate coated with an intermediate coating composition was air sprayed with a high-solid base coating composition (manufactured by Nippon Paint Co., Ltd.) so that the dry thickness became about 16 μm, followed by setting for about 7 minutes. Provided that, when an aqueous base coating composition (manufactured by Nippon Paint Co., Ltd.) was used (Examples 16 and 17), the air sprayed coating was set about one minute and preheated at 80° C. for 5 minutes.

Then, the respective resin components were mixed according to the formulations (solid content) shown in Tables 6 and 7 and viscosity was controlled to 30 seconds/#4 Ford cup to prepare a clear coating composition. The resulting coating composition was coated on the basecoated plate by using an electrodeposition coating device ("Auto Rea", manufactured by Lansberg Gema Co.) at an atomizing pressure of 5 kg/cm² so that a dry thickness became about 40 μm, followed by setting for about 7 minutes and baking at 160° C. for 30 minutes.

The resulting coated plate was left to stand in a desiccator for 30 minutes. Then, the high-solid base coating composition (manufactured by Nippon Paint Co., Ltd.) was coated and set according to the same manner as that described above and the clear coating composition was coated and set according to the same manner as that described above, followed by baking at 120° C. for 30 minutes.

Cross cuts (11 vertical cuts×11 horizontal cuts at 2 mm in space) penetrating through the coated film to a foundation of the coated plate were formed on a surface of the coated film using a cutter knife (NT cutter, S or A type) to form 100 squares on the coated film. An adhesive tape ("cellophane tape" manufactured by Nichiban C., Ltd.) having a width of 24 mm was adhered uniformly on the crosscut coated film by hand so that no foam is formed. Immediately, the adhesive tape was rapidly peeled off from the surface of the coated film by pulling one end of the adhesive tape perpendicular to a surface of the coated film.

Adhesiveness of the coated film were evaluated according to the criteria based on an area (%) of the coated film peeled off together with the adhesive tape.

| Peeled area (%) | Evaluation |
| --- | --- |
| 0% | 5 |
| 5% or less, and a square is not peeled completely | 4 |
| 15% or less, and a square is not peeled completely | 3 |
| 35% or less | 2 |
| 35% or more | 1 |

Examples 2 to 15 and 18 to 22

According to the same manner as that described in Example 1 except for using the formulations shown in the following Tables 6 and 7, clear coated films were prepared and performances of the coated films were evaluated, respectively. The results are shown in Tables 6 and 7.

In Example 15, "F-244-09" manufactured by Nippon Unicar Co., Ltd. was used as the silicone polymer (d)-1. In the formula (II), $R^1$ is a methyl group, $R^2$ is a γ-glycidoxypropyl group/(trimethoxysilyl)-ethyl group=2/1, $R^3$, $R^4$, $R^5$ and $R^6$ are a methyl group, l is 6, m is 2, n is 0, an epoxy equivalent is 318 and an alkoxy equivalent is 213.

In Example 19, "Denacol EX-314" (glycidyl ether type epoxy resin of glycerol, epoxy equivalent 145, manufactured by Nagase Kasei Kogyo Co., Ltd.) was used as the polyepoxide (c)-6.

Comparative Examples 1 to 3

According to the same manner as that described in Example 1 except for using the formulation shown in the following Table 7, clear coated films were prepared and performances of the coated films were evaluated. The results are shown in Table 7.

Comparative Example 4

According to the same manner as that described in Example 1 except for using a high-solid type melamine coating composition manufactured by Nippon Paint Co., Ltd., having the formulation shown in Table 5, a clear coated film was prepared and performances of the coated film were evaluated. The results are shown in Table 7.

| Component | Amount (parts) |
| --- | --- |
| Acrylic resin manufactured by Nippon Paint Co., Ltd. (nonvolatile content 80%, hydroxyl group value 100, acid value 10, number-average molecular weight 1800) | 75 |
| Melamine resin "Cymel 303", manufactured by Mitsui Cytec Co., Ltd. (nonvolatile content 100%) | 20 |
| Melamine resin "Uban 120", manufactured by Mitsui Toatsu Co., Ltd. (nonvolatile content 90%) | 22 |
| Paratoluenesulfonic acid:diisopropanolamine (=1:1) | 1.8 |
| Ultraviolet absorber "Tinubin 900" manufactured by Ciba Geigy Co., Ltd. | 2 |
| Photostabilizer "Sanol LS-440", manufactured by Sankyo Co., Ltd. | 1 |
| Surface modifier "Modaflow", manufactured by Monsanto Co. | 0.1 |
| Aromatic hydrocarbon solvent "Solvesso 100", manufactured by Shell Chemical Co. | 10 |

Examples 16 and 17

According to the same manner as that described in Example 1, a clear coating composition was firstly obtained using the formulation shown in Table 7.

On the other hand, a coated test plate was prepared by coating a phosphated steel plate having a thickness of 0.8 mm with a cationic electrodeposition coating composition (Powertop U-50, manufactured by Nippon Paint Co., Ltd.) and an intermediate coating composition (Orga P-2, manufactured by Nippon Paint Co., Ltd.) so that a dry thickness became 25 and 40 $\mu$m, respectively.

The coated test plate was then coated with a water type base coating composition (Example 1 of U.S. Pat. No. 5,183,504) so that a dry thickness became about 15 m, followed by setting at 80° C. for 5 minutes to form a base coated film.

The clear coating composition obtained was coated thereon using an electrodeposition coating device ("Auto Rea", manufactured by Lansberg Gema Co.) at an atomizing pressure of 5 kg/cm$^2$ so that a dry thickness became about 40 gm, followed by setting for about 7 minutes and baking at 140° C. for 25 minutes.

Meanwhile, a formulation of the aqueous base coating composition is 56.2 parts of the acrylic resin varnish having a number-average molecular weight of 12000, a hydroxyl value of 70, an acid value of 58 and a nonvolatile content of 50% obtained in Preparation Example 1 of the same reference, 15.0 parts of methyled melamine "Cymel 303" (manufactured by Mitsui Cytec Co., Ltd.), 21.5 parts of an urethane emulsion having an acid value of 16.2 and a nonvolatile content of 33%, 7.5 parts of an aluminum pigment paste "Alpaste 7160N" having an aluminum flake content of 65% (manufactured by Toyo Aluminum Co., Ltd.) and 1.0 part of isostearic acid phosphate "Phosphorex A-180L" (manufactured by Sakai Kagaku Co., Ltd.).

According to the same manner as that described in Example 1, the performances of the resulting coated film were evaluated. The results are shown in Table 7.

TABLE 6

| | | Example No. | | | | | | | | | | | | |
| --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 | 13 |
| Formulation of resin | (a)-1 | 30.5 | 30.2 | | | | | | | | | | | |
| | (a)-2 | | | 33.5 | | | | | | | | | | |
| | (a)-3 | | | | 31.0 | | | | | | | | | |
| | (a)-4 | | | | | 41.8 | 30.4 | 19.1 | 30.3 | 33.2 | 27.0 | 27.0 | | |
| | (a)-5 | | | | | | | | | | | | 34.4 | 30.3 |
| | (a)-6 | | | | | | | | | | | | | |
| | (a)-7 | | | | | | | | | | | | | |
| | (b)-1 | 20.0 | | | | 10.0 | 20.0 | 30.0 | | 20.0 | | | | |
| | (b)-2 | | 20.0 | | | | | | | | | | | |
| | (b)-3 | | | 20.0 | | | | | | | | | | |
| | (b)-4 | | | | 20.0 | | | | 20.0 | | 20.0 | 20.0 | | |
| | (b)-5 | | | | | | | | | | | | 20.0 | |
| | (b)-6 | | | | | | | | | | | | | 20.0 |
| | (b)-7 | | | | | | | | | | | | | |
| | (b)-8 | | | | | | | | | | | | | |
| | (c)-1 | 49.5 | 49.8 | 46.5 | 49.0 | 48.2 | 49.6 | 50.9 | 49.7 | | | | 45.6 | 49.7 |
| | (c)-2 | | | | | | | | | 46.7 | | 33.0 | | |
| | (c)-3 | | | | | | | | | | 53.0 | | | |
| | (c)-4 | | | | | | | | | | | 20.0 | | |
| | (c)-5 | | | | | | | | | | | | | |
| | (c)-6[1] | | | | | | | | | | | | | |
| | (c)-7 | | | | | | | | | | | | | |
| | (d)-1[2] | | | | | | | | | | | | | |

TABLE 6-continued

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Total | 100.0 | 100.0 | 100.0 | 100.0 | 100.0 | 100.0 | 100.0 | 100.0 | 100.0 | 100.0 | 100.0 | 100.0 | 100.0 |
| Nonvolatile content (% by weight) | 53 | 53 | 52 | 54 | 50 | 54 | 56 | 54 | 52 | 55 | 54 | 52 | 53 |
| Pencil hardness | F | F | F | H | H | H | H | H | H | H | H | F | H |
| Water resistance | O | O | O | O | O | O | O | O | O | O | O | O | O |
| Mar resistance | 55 | 56 | 53 | 63 | 65 | 67 | 66 | 67 | 65 | 62 | 65 | 63 | 65 |
| Acid resistance | 4 | 4 | 4 | 5 | 5 | 5 | 5 | 5 | 5 | 5 | 5 | 5 | 5 |
| Weather resistance | O | O | O | O | O | O | O | O | O | O | O | O | O |
| Adhesiveness | 5 | 5 | 4 | 5 | 5 | 5 | 5 | 5 | 4 | 5 | 5 | 5 | 5 |

[1]"Denacol EX-314" manufactured by Nagase Kasei Kogyo Co., Ltd.
[2]"F-244-09" manufactured by Nippon Unicar Co., Ltd.

TABLE 7

| | | Example No. | | | | | | | | | Comparative Example No. | | | |
|---|---|---|---|---|---|---|---|---|---|---|---|---|---|---|
| | | 14 | 15 | 16 | 17 | 18 | 19 | 20 | 21 | 22 | 1 | 2 | 3 | 4 |
| Formulation of resin | (a)-1 | | | | | | | | | | | | | Current melamine[3] |
| | (a)-2 | | | | | | | | | | | | | |
| | (a)-3 | | | | | | | | | | 53.2 | 39.7 | 35.6 | |
| | (a)-4 | | 30.7 | 27.6 | 33.1 | 23.9 | 37.1 | 22.4 | | | | | | |
| | (a)-5 | | | | | | | | | | | | | |
| | (a)-6 | 30.4 | | | | | | | | | | | | |
| | (a)-7 | | | | | | | | 38.3 | 25.2 | | | | |
| | (b)-1 | 20.0 | 20.0 | 20.0 | 20.0 | | | | | | | | | |
| | (b)-2 | | | | | | | | | | | | | |
| | (b)-3 | | | | | | | | | | | | | |
| | (b)-4 | | | | | 20.0 | 20.0 | | | | | | | |
| | (b)-5 | | | | | | | 25.0 | 20.0 | 25.0 | | | | |
| | (b)-6 | | | | | | | | | | | | | |
| | (b)-7 | | | | | | | | | | | 20.0 | | |
| | (b)-8 | | | | | | | | | | | | 20.0 | |
| | (c)-1 | 49.6 | 44.3 | 52.4 | 46.9 | | 32.9 | | 41.7 | | 46.8 | 40.3 | 44.4 | |
| | (c)-2 | | | | | | | | | | | | | |
| | (c)-3 | | | | | | | | | | | | | |
| | (c)-4 | | | | | | | | | | | | | |
| | (c)-5 | | | | | 56.1 | | | | | | | | |
| | (c)-6[1] | | | | | | 10.0 | | | | | | | |
| | (c)-7 | | | | | | | 52.6 | | 49.8 | | | | |
| | (d)-1[2] | | 5.0 | | | | | | | | | | | |
| Total | | 100.0 | 100.0 | 100.0 | 100.0 | 100.0 | 100.0 | 100.0 | 100.0 | 100.0 | 100.0 | 100.0 | 100.0 | |
| Nonvolatile content (% by weight) | | 53 | 57 | 54 | 53 | 53 | 55 | 50 | 48 | 46 | 46 | 53 | 43 | 55 |
| Pencil hardness | | H | F | H | H | F | H | H | H | H | F | B | HB | F |
| Water resistance | | O | O | O | O | O | O | O | O | O | O | Δ | Δ | O |
| Mar resistance | | 64 | 69 | 63 | 61 | 69 | 64 | 65 | 66 | 68 | 51 | 38 | 44 | 65 |
| Acid resistance | | 5 | 5 | 5 | 5 | 5 | 5 | 5 | 5 | 5 | 5 | 3 | 4 | 1 |
| Weather resistance | | O | O | O | O | O | O | O | O | O | O | O | Δ | O |
| Adhesiveness | | 5 | 5 | 5 | 5 | 5 | 5 | 5 | 5 | 5 | 4 | 4 | 3 | 5 |

[1]"Denacol EX-314" manufactured by Nagase Kasei Kogyo Co., Ltd.
[2]"F-244-09" manufactured by Nippon Unicar Co., Ltd.
[3]High-solid type melamine coating composition manufactured by Nippon Paint Co., Ltd.

What is claimed is:

1. A method for forming a coated film, which comprises:
   (1) applying a water-based or solvent-based coating composition on an undercoated or intercoated substrate to form a base coating;
   (2) applying a clear coating composition thereon to form a clear coating, without curing the base coating, wherein the clear coating composition comprises, as a binder component, a curable resin composition comprising:
      (a) 10 to 70% by weight of an acrylic polycarboxylic acid having 2 or more carboxyl groups per molecule on an average, an acid value of 5 to 300 mg KOH/g (solid) and a number-average molecular weight of 500 to 8000 obtained by copolymerizing an acid anhydride group-containing ethylenically unsaturated monomer with an ethylenically unsaturated monomer having no acid anhydride group and then reacting the resulting copolymer with a monoalcohol;
      (b) 5 to 70% by weight of a polyester polycarboxylic acid having an acid value of 50 to 350 mg KOH/g (solid), a number-average molecular weight of 400 to 3500 and a ratio of weight-average molecular weight to number-average molecular weight of 1.8 or less, which is obtained by reacting a polyester polyol having 3 or more hydroxyl groups with an acid anhydride group-containing compound; and (c) 10 to 80% by weight of a polyepoxide with both an epoxy group and a hydroxyl group, having an epoxy equivalent of 50 to 700 and a number-average molecular weight of 200 to 10000;

provided that the amounts of the components (a) to (c) are based on the weight of the total solid contained in the curable resin composition; and further comprising (d) crosslinked resin particles prepared in the presence of an amphoteric ionic group-containing polyester resin; and (3) heating and curing both the base coating and clear coating.

2. The method according to claim 1, wherein the acrylic polycarboxylic acid (a) is an acrylic polycarboxylic acid having a carboxyl group and a carboxylate group, which is obtained by reacting:

(i) an acrylic polyanhydride, obtained by copolymerizing,
   (1) 15 to 40% by weight of an acid anhydride group-containing ethylenically unsaturated monomer, with
   (2) 60 to 85% by weight of an ethylenically unsaturated monomer having no acid anhydride group; with
(ii) a monoalcohol having 1 to 12 carbon atoms; in an amount that a molar ratio of an acid anhydride group to a hydroxyl group becomes 1/10 to 1/1.

3. The method according to claim 1, wherein the polyepoxide (c) is a polyepoxide having a hydroxyl group and an epoxy group, which is obtained by copolymerizing:

(i) 5 to 70% by weight of a hydroxyl group-containing ethylenically unsaturated monomer represented by the formula:

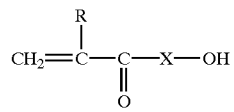 (I)

wherein R is a hydrogen atom or a methyl group, and X is an organic chain represented by the formula:

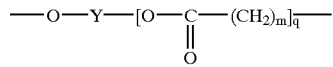

wherein Y is a linear or branched alkylene group having 2 to 8 carbon atoms, m is an integer of 3 to 7 and q is an integer of 0 to 4, or an organic chain represented by the formula:

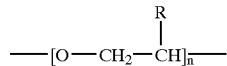

wherein R is a hydrogen atom or a methyl group and n is an integer of 2 to 50;

(ii) 10 to 60% by weight of an epoxy group-containing ethylenically unsaturated monomer; and
(iii) 0 to 85% by weight of an ethylenically unsaturated monomer having neither hydroxyl group nor epoxy group.

4. The method according to claim 1, wherein all carboxyl groups of the polyester polycarboxylic acid are terminal carboxyl groups.

5. The method according to claim 1, wherein the polyester polyol is obtained by extending a chain of a low-molecular weight polyhydric alcohol having 3 to 16 carbon atoms and having 3 or more hydroxyl groups, by adding a lactone compound having 4 to 7 carbon atoms to the low-molecular weight polyhydric alcohol.

6. The method according to claim 5, wherein the low-molecular weight polyhydric alcohol is selected from the group consisting of trimethylolpropane, trimethylolethane, 1,2,4-butanetriol, ditrimethylolpropane, pentaerythritol and dipentaerythritol.

7. The method according to claim 5, wherein the lactone compound is selected from the group consisting of ε-caprolactone, γ-caprolactone, γ-valerolactone, δ-valerolactone and γ-butyrolactone.

8. The method according to claim 1, wherein the clear coating composition further comprises a curing catalyst.

9. A coated product obtained by the method of claim 1.

* * * * *